United States Patent
Brookhart et al.

[11] Patent Number: 6,148,939
[45] Date of Patent: Nov. 21, 2000

[54] VARIABLE GAIN STEERING CONTROL SYSTEM FOR A WORK MACHINE

[75] Inventors: Roy V. Brookhart, Cary, N.C.; Steven T. Ufheil, East Peoria, Ill.

[73] Assignee: Caterpillar Inc., Peoria, Ill.

[21] Appl. No.: 09/218,922

[22] Filed: Dec. 22, 1998

[51] Int. Cl.[7] .................................................. B62D 11/00
[52] U.S. Cl. .......................................... 180/6.48; 180/333
[58] Field of Search .................................. 180/6.2, 6.44, 180/6.48, 6.5, 333, 6.7; 701/41, 42

[56] References Cited

U.S. PATENT DOCUMENTS

| | | | |
|---|---|---|---|
| 4,036,321 | 7/1977 | Habiger | 180/6.48 |
| 4,213,484 | 7/1980 | Habiger | 137/636.1 |
| 4,235,297 | 11/1980 | Porta | 180/6.48 |
| 4,372,407 | 2/1983 | McColl | 180/6.2 |
| 4,914,592 | 4/1990 | Callahan et al. | 364/424.05 |
| 5,086,870 | 2/1992 | Bolduc | 180/333 |
| 5,263,901 | 11/1993 | Kawakami et al. | 180/6.48 |
| 5,307,888 | 5/1994 | Urvoy | 180/6.2 |
| 5,415,596 | 5/1995 | Zulu | 475/27 |
| 5,579,863 | 12/1996 | Nelson et al. | 180/418 |
| 5,590,041 | 12/1996 | Cooper | 701/41 |
| 5,653,155 | 8/1997 | Hausman et al. | 91/523 |
| 5,842,532 | 12/1998 | Fox et al. | 180/6.48 |
| 5,948,029 | 9/1999 | Straetker | 701/41 |

FOREIGN PATENT DOCUMENTS 0785311  1/1997  European Pat. Off. .......... E02F 9/20

*Primary Examiner*—Kevin Hurley
*Attorney, Agent, or Firm*—Blackwell Sanders Peper Martin

[57] ABSTRACT

A steering control system for controlling the steering of a work machine which utilizes differential speed control for maneuvering the machine wherein the operator of the work machine can select any one of a plurality of different steering modes which vary the gain of the operator input steering device based upon operating or environmental conditions, or based upon other sensed conditions of the work machine such as the ground speed of the machine. The present steering control system includes an operator input device actuatable to command a particular direction of movement of the work machine, a steering mode switch or other operator selectable mechanism for selecting any one of a plurality of different steering mode correlations established between actuation of the operator input device and operation of the respective left and right drive motors associated with the work machine, each steering mode correlation representing a different mode of operation of the left and right drive motors for the same input to the operator input device, and an electronic controller coupled with the operator input device and with the steering mode switch or other mechanism for receiving signals therefrom and for outputting signals to control the operation of the left and right drive motors in accordance with the selected steering mode.

14 Claims, 3 Drawing Sheets

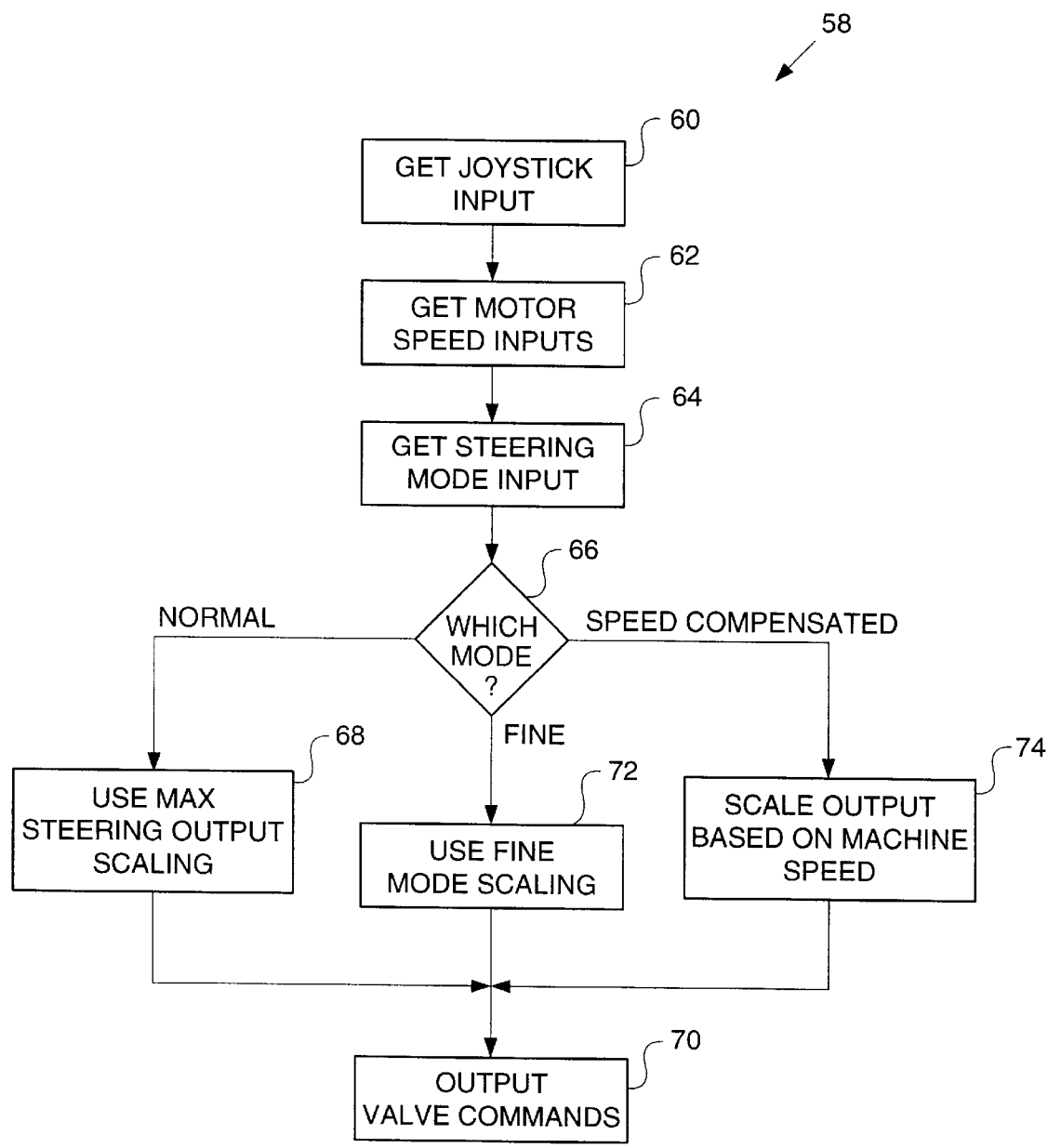

VARIABLE GAIN STEERING CONTROL SYSTEM FOR A WORK MACHINE

TECHNICAL FIELD

This invention relates generally to a steering control system for use on work machines and, more particularly, to a steering control system which varies the gain of the operator input device which controls steering based upon inputs from the operator and/or certain sensed conditions of the machine.

BACKGROUND ART

Many different types of work machines, such as track type loaders, track type tractors, skid steer loaders, excavators and the like, utilize differential speed control to effect steering of the machine. On these types of work machines, steering is typically accomplished by changing the relative speed between the left and right drive motors associated with such machines. The left drive motor typically controls the speed at which the left track, belt or machine wheels rotate in a fore and aft direction, and the right drive motor typically controls the speed at which the right drive mechanism rotates in the fore and aft direction. Where such drive motors are hydrostatic, the reaction of the work machine to various steering commands can vary depending upon the ground speed of the machine, engine speed, and the available hydraulic flow to the respective drive motors. Generally, the higher the engine speed, the higher the pump flow available to the drive motors. This creates a more responsive, less controllable machine at higher engine speeds.

In addition, the very nature of these types of work machines requires that such machines be used in confined areas such as close to buildings and the like where precise maneuvering is required. Since the gain typically associated with the operator input device that controls the steering of the machine, such as one or more steering control levers or a joystick, is fixed, moving the operator input device a certain displacement will always produce the same steering response regardless of the particular work environment or operating conditions of the machine. For example, in an environment where the particular work machine is working close to a building, a finer or more precise control of the steering command is desirable and large steering corrections may facilitate an unsafe operating condition.

Still further, certain work tools used on certain types of work machines require high engine speed in order to operate the work tool properly. These higher operating engine speeds produce a higher output flow from the hydraulic pump which controls the respective drive motors. As previously explained, this creates a more responsive, less controllable steering command at high engine speeds. As a result, turning the particular work machine will be jerky at best. When these types of work tools are used, it is sometimes very difficult to control the steering of the particular machine, particularly in space limited environments.

It is therefore desirable to provide a steering control system which allows an operator to select different modes of steering and vary the gain of the operator input steering device based upon the particular work environment of the machine, or other sensed conditions of the machine. Under certain conditions, it is also desirable to vary the gain of the operator input steering device based upon the type of tool being utilized on the machine.

Accordingly, the present invention is directed to overcoming one or more of the problems as set forth above.

DISCLOSURE OF THE INVENTION

In one aspect of the present invention, an operator selectable steering control system is disclosed wherein a steering mode switch, an operator input steering device, and certain sensors are all coupled to an electronic controller in a particular manner such that switch and sensor signals inputted to the controller will control the gain associated with the operator input device and, based upon the selected gain and the displacement of the steering input device, the controller will output the appropriate control signals to the appropriate drive motor solenoids for steering and/or turning the work machine based upon the inputted steering commands. The operator input device is coupled through the electronic controller to appropriate right and left drive motor solenoids which control the left and right drive mechanisms associated with the particular work machine.

In one embodiment of the present invention, the steering mode switch includes, a plurality of different selectable modes of steering such as a "Normal" mode, a "Fine" mode, and a "Speed Compensating" mode. During normal operation, the steering mode switch would be selected to the Normal mode position whereby the electronic controller would output steering commands that utilize the full range of operation of the respective drive motor control solenoids. This mode of steering would provide the most responsive and quickest turns.

In cases where the work machine is being utilized in relatively tight areas, the operator can select the Fine mode position on the steering mode switch. In this particular mode, full movement or travel of the operator input steering device will result in only partial movement of the respective motor control solenoids. This, in effect, reduces the speed and response of the machine and allows more precise control of the steering command resulting in better maneuverability of the machine.

Still further, the operator can position the steering mode switch to its Speed Compensating mode position wherein the steering gain associated with the operator input device is automatically changed based upon the ground speed of the work machine. At slow speeds, the full steering command would be utilized whereas as the ground speed of the work machine increases, the allowable steering command would be reduced, thus preventing sudden major steering commands from putting the machine in an unsafe operating condition. In this particular steering mode, speed sensors associated with the respective right and left drive motors will input the current ground speed of the work machine to the electronic controller and, based upon such ground speed, the electronic controller will output the appropriate control signals to the appropriate right and left drive motor solenoids in response to the steering commands inputted by the operator.

A wide variety of other steering mode gains or correlations between actuation of the operator input device and control of the respective left and right drive motors are also possible and anticipated including structuring steering mode gains or correlations based upon the use of certain types of work tools or attachments in association with a particular work machine.

The present system therefore enables an operator to select a particular mode of steering based upon the particular work conditions encountered and thereafter input steering commands to the operator input device without necessarily putting the work machine in an unsafe operating condition. In effect, once the appropriate steering mode is selected, the operator input device inputs a signal to the electronic controller based upon a certain amount of displacement of such input device. The electronic controller in turn converts such steering command signal into a certain current signal based upon the particular steering mode selected and outputs such command to the appropriate left and right drive motor solenoids. The solenoids then convert the current signal outputted by the electronic controller into a particular pressure or flow to the respective left and right drive motors for accomplishing the commanded steering.

It is also recognized and anticipated that the steering mode switch can be a proportional input switch whereby the operator can select the desired gain for the steering control system without having to select a discrete steering mode such as the Normal mode or the Fine mode. Still further, it is recognized that the steering mode switch can be replaced with any suitable operator selectable means for selecting any of the different plurality of steering mode gains or correlations. For example, the operator may be able to access a computer menu through the electronic systems associated with the particular work machine, this computer menu including all of the different steering modes and including means for selecting and actuating any one of such different steering modes. Other operator selectable means are also recognized and anticipated.

The present steering control system can be incorporated into any work machine which utilizes differential speed control to effect steering.

BRIEF DESCRIPTION OF THE DRAWINGS

For a better understanding of the present invention, reference may be made to the accompanying drawings in which:

FIG. 3 is a flow chart of operating steps for one embodiment of the present steering control system constructed in accordance with the teachings of the present invention.

BEST MODE FOR CARRYING OUT THE INVENTION

A typical work machine incorporating the present steering control system would include left and right drive motors for controlling the speed of the tracks or wheels associated with the particular work machine. These drive motors are hydraulically controlled through various solenoid valves which are supplied with hydraulic fluid by some type of hydraulic pump such as a constant displacement hydraulic pump. The flow of hydraulic fluid to the various solenoid valves can be controlled through the use of one or more operator input steering control levers, or a drive or steering control joystick. Although it is recognized and anticipated that a wide variety of various means can be utilized for actuating and controlling the left and right drive motor solenoids, the present invention will be described with reference to a direction control joystick.

Figure 1:
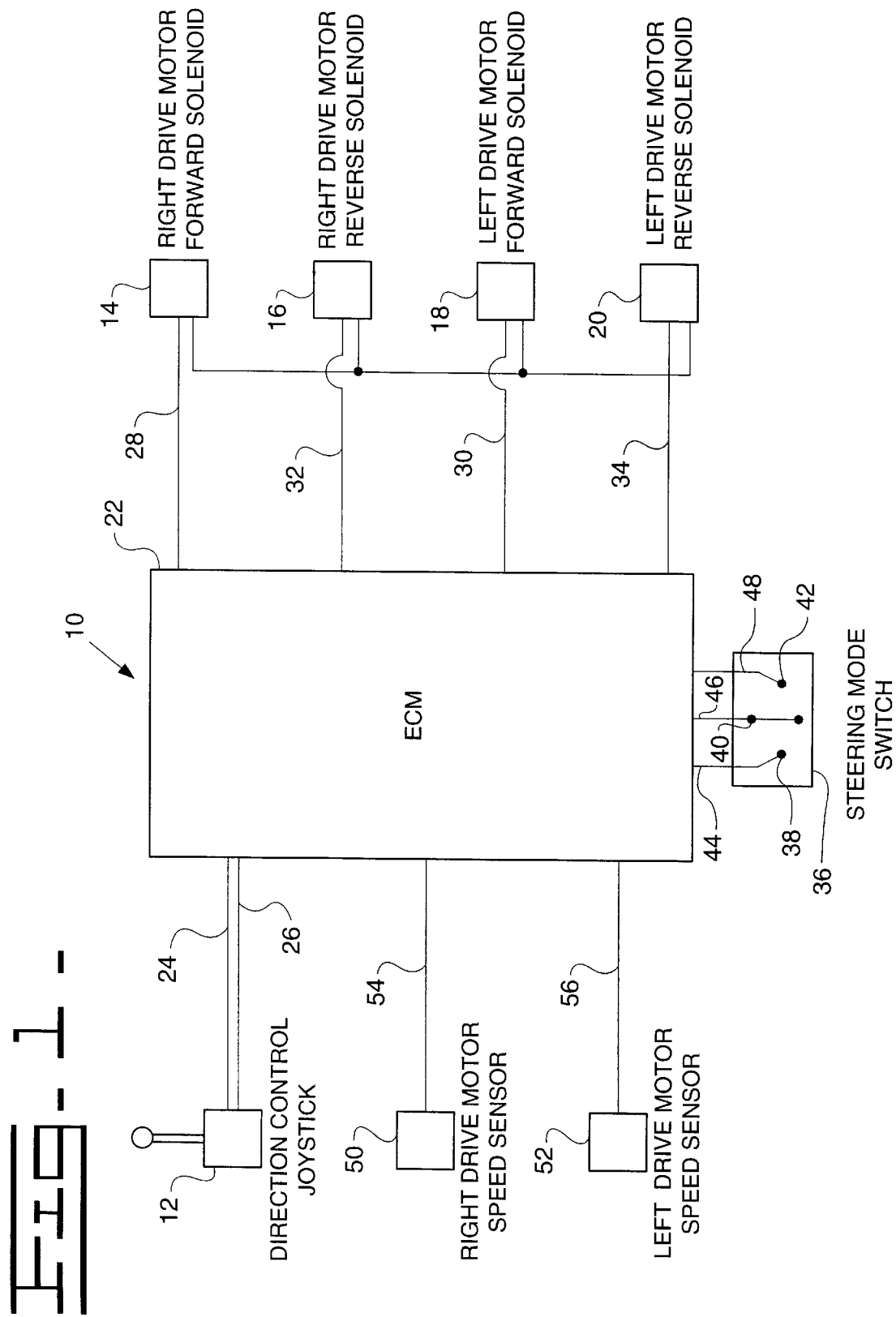
FIG. 1 is a schematic diagram of a steering control system constructed in accordance with the teachings of the present invention.

Referring to FIG. 1, numeral 10 in FIG. 1 represents one embodiment of the present steering control system which includes a direction control joystick 12 which is typically mounted on a console in the operator compartment so as to be easily grasped and manipulated by the machine operator. The direction control joystick 12 is coupled or linked to a plurality of proportional solenoids which are actuated by movement of the joystick to control the flow of hydraulic fluid to, for example, a right drive motor forward solenoid 14, a right drive motor reverse solenoid 16, a left drive motor forward solenoid 18, and a left drive motor reverse solenoid 20. The joystick 12 is a two axis joystick which may be pushed in the forward, rearward, left and right directions to move or steer the machine accordingly. Fore and aft movement of the joystick controls the forward and reverse direction of the work machine whereas the left and right movement of the joystick controls movement of the work machine to the left and right. The extent to which the joystick 12 is pushed in a certain direction controls the amount of hydraulic fluid supplied to the solenoids 14, 16, 18 and 20, and therefore affects the speed and movement of the work machine.

The joystick 12 is coupled to an electronic control module 22 (ECM) via conductive paths 24 and 26. Conductive path 24 would be associated with one axis of the joystick such as the fore and aft control axis whereas conductive path 26 would be associated with the other axis of the joystick such as the left and right control axis. The amount of movement or displacement of the joystick 12 in either the fore and aft direction will control the ground speed of the work machine whereas the amount of movement or displacement of the joystick 12 to the left or right will control the rate of turn of the machine. In other words, the more the joystick 12 is displaced in the forward direction, the faster the left and right drive motors turn thereby increasing the forward speed of the machine. ECM 22 senses this joystick displacement via conductive path 24 and outputs appropriate signals via conductive paths 28 and 30 to the right and left drive motor forward solenoids 14 and 18 to achieve the requested forward speed. In similar fashion, ECM 22 will output appropriate signals via conductive paths 32 and 34 to the right and left drive motor reverse solenoids 16 and 20 in order to achieve a requested reverse speed.

When the joystick 12 is moved left or right, such steering commands are inputted to ECM 22 via conductive path 26 and, based upon such steering command input, ECM 22 will output appropriate signals via conductive paths 28 and 30, or conductive paths 32 and 34, to either the right and left drive motor forward solenoids 14 and 18, or the right and left drive motor reverse solenoids 16 and 20, to effect a speed differential between the right and left drive motors in the direction of the joystick displacement to achieve the requested turn. For example, if the joystick 12 is moved to the left a certain amount, the signal outputted to the right drive motor forward solenoid 14 will command a speed or motor RPM which will be greater than the speed command outputted to the left drive motor forward solenoid 18. This will cause the work machine to essentially skid through the turn to the left. The reverse will be true when a right turn is commanded.

The proportional solenoids 14, 16, 18 and 20 are used in a conventional manner to control the hydraulic flow to the respective right and left drive motors. These solenoids are typically controlled by the amount of displacement associated with the joystick 12. For example, displacing the joystick 12 a certain amount in the forward, reverse, left or right direction will result in ECM 22 outputting a signal via the appropriate conductive paths 28, 30, 32 and/or 34 to energize the appropriate solenoids, the solenoids 14, 16, 18 and 20 being energized proportional to the amount of displacement applied to the joystick 12 in the appropriate direction. In this regard, once the deadband of the joystick is overcome in either the forward, reverse, left or right direction, the current to the appropriate solenoids will be commanded to a threshold level. The current to the appropriate solenoids will then continue to increase as the joystick 12 is further displaced in the selected direction. Maximum current will be obtained when the joystick is fully displaced in the appropriate direction. Releasing the joystick 12 will allow the joystick to return to the neutral position, turning off current to the respective solenoids. Maximum displacement of the joystick 12 in any direction outputting maximum current to the appropriate solenoids 14, 16, 18 and/or 20 represents normal operation of the drive control system and corresponds to a "normal" steering mode wherein the full range of use of the drive motor control solenoids 14, 16, 18 and 20 are utilized. When ECM 22 outputs a signal to one or more of the solenoids 14, 16, 18 and 20, such signal is indicative of a certain amount of current based upon the displacement of the joystick in a particular direction. The solenoids 14, 16, 18 and 20 thereafter convert such current signal into a pressure or flow through the solenoid to the respective left and right drive motors for controlling the speed or RPM of such motors.

In certain operating conditions, such as when the particular work machine is being utilized in relatively tight areas, normal steering command or gain associated with the joystick 12 may not be desirable for the reasons explained above. As a result, the present system includes a steering mode switch 36 which should be conveniently mounted or located within the operator compartment for easy access by the operator. The steering mode switch 36 is a multi-positionable switch which allows the operator to manually select a plurality of different steering modes depending upon the particular work and/or environmental conditions encountered. For example, the steering mode switch 36 will include a Normal steering mode position as described above, as well as a Fine steering mode position and a Speed Compensating position. These three different mode positions are represented by contact points 38, 40 and 42 in FIG. 1, contact point 38 representing the Normal steering mode, contact point 40 representing the Fine steering mode, and contact point 42 representing the Speed Compensating steering mode. Switch 36 is likewise coupled to or with ECM 22 via conductive paths 44, 46 and 48, conductive path 44 being associated with the Normal steering mode position of switch 36, conductive path 46 being associated with the Fine steering mode position of switch 36, and conductive path 48 being associated with the Speed Compensating mode position of switch 36. As such, ECM 22 will continuously monitor and sense the position of switch 36 and a signal indicative of the position of such switch is continuously inputted via one of the conductive paths 44, 46 and 48 to ECM 22.

When the steering mode switch 36 is selectively positioned to the Normal steering mode position, operation of the joystick 12 in conjunction with the respective solenoids 14, 16, 18 and 20 is as previously explained above, the gain or correlation between displacement of the joystick 12 in any particular direction and operation of the respective solenoids 14, 16, 18 and 20 being predetermined and classified as normal operation. It is recognized and anticipated that the gain associated with joystick 12 when in the Normal steering mode of operation can be established to meet any particular operating needs and/or limitations including any maximum limitations associated with the particular proportional solenoids being used in the system. These particular parameters or values associated with the Normal steering mode of operation will be programmed into ECM 22 and can take the form of a look-up table, a map, or one or more equations or algorithms which can be used to establish the pressure or flow output from the respective solenoids to the left and right drive motors when switch 36 is selected to the Normal mode position.

When steering mode switch 36 is positioned to select the Fine steering mode position represented by contact point 40, ECM 22 senses this switch position via conductive path 46 and reprograms the gain or correlation between the displacement of the joystick 12 and the hydraulic pressure or flow outputted from the respective solenoids 14, 16, 18 and/or 20 to the left and right drive motors. For example, if full scale displacement of the joystick 12 in any direction commands maximum or 100% pressure or flow to the respective drive motors when the switch 36 is in the Normal operating mode, the steering gain associated with the Fine steering mode position of switch 36 may only command 50% of the pressure or flow output from the respective solenoids when full scale displacement of the joystick 12 is achieved in any direction. In other words, output from the respective solenoids are scaled back proportionately compared to the Normal operating steering mode. This means that a more precise and smoother steering maneuverability of the particular work machine can be achieved since greater joystick displacement will produce smaller or lesser incremental changes in the speed of the respective drive motors thereby affording better operator control of the machine during a turning maneuver. This mode of operation is particularly useful when the work machine is being maneuvered and operated close to a building or other obstacle, or in a space limited working area.

Once ECM 22 receives an input from switch 36 representative of the Fine steering mode having been selected via conductive path 46, ECM 22 will output appropriate signals to the respective solenoids 14, 16, 18 and 20 based upon the data and parameters stored or programmed into ECM 22 which correspond to a reduced pressure or flow output from the respective solenoids. Here again, the correlation between displacement of the joystick 12 in any particular direction and the pressure or flow output from the respective solenoids commanded by ECM 22 via conductive paths 28, 30, 32 and/or 34 can be programmed into ECM 22 via look-up tables, a map, or appropriate algorithms. It is recognized and anticipated that the reduced solenoid output corresponding to the Fine steering mode position on switch 36 can be established at any proportional or scaled level compared to the parameters established for the Normal steering mode.

The machine operator can also select a Speed Compensating steering mode by moving steering mode switch 36 to contact point 42 (FIG. 1). In this particular mode, the steering gain or correlation between displacement of joystick 12 and the hydraulic pressure or flow output from the respective solenoids 14, 16, 18 and 20 are varied in accordance with the forward or reverse speed of the work machine. In this particular mode, selection of the speed compensating steering mode via switch 36 will input a signal to ECM 22 via conductive path 48 and, at this time, ECM 22 will receive and analyze signals inputted from right and left drive motor speed sensors 50 and 52 in order to determine the ground speed of the work machine. Speed sensors 50 and 52 are likewise coupled to ECM 22 via conductive paths 54 and 56 for constantly delivering speed indicative signals to ECM 22 during the operation of the particular work machine. Since the RPM of the respective right and left drive motors is directly related to the respective left and right track or wheel speed of the machine, sensors 50 and 52 could be passive speed type sensors commonly used in the industry wherein a sensing element is positioned and located to pulse and count the number of gear teeth passing in front of the element over a certain period of time and thereafter output signals via conductive paths 54 and 56 indicative of the RPM of the respective drive motors. ECM 22 could then take the RPM speed of the respective left and right drive motors and convert such RPM speeds into the ground speed of the machine via look-up tables, standard equations, a speed correlation map, or other algorithms or programming. If the work machine is in a turn and the respective left and right drive motor speeds are different, ECM 22 will use the common forward or reverse component of such speed vector to obtain the forward or reverse ground speed of the machine.

The speed sensors 50 and 52 could likewise take the form of a radar unit properly positioned on the work machine, the use of which is likewise well known in the art. Other sensors for outputting speed indicative signals to ECM 22 are likewise well known in the art and could likewise be utilized to determine the ground speed of the particular work machine.

Regardless of the type of speed sensors utilized, when ECM 22 senses that steering mode switch 36 has been positioned to the Speed Compensating mode via conductive path 48, it will determine the ground speed of the work machine via the signals inputted from speed sensors 50 and 52 and, based upon the then current ground speed of the work machine, it will output signals via conductive paths 28, 30, 32 and/or 34 to the appropriate solenoids 14, 16, 18 and/or 20. In this particular mode, the signals outputted by ECM 22 will represent a varying current signal to the respective solenoids based upon the ground speed of the machine. In other words, at slower machine speeds, the full steering command and output from the respective solenoids 14, 16, 18 and 22 will be utilized. However, as the machine ground speed increases, the same amount of joystick displacement will produce a reduced steering command to the respective solenoids similar to that explained with respect to moving switch 36 from the Normal steering mode position to the Fine steering mode position. In other words, for each predetermined incremental change in machine ground speed, ECM 22 outputs a different steering command signal to the respective solenoids. It is recognized and anticipated that any plurality of different steering gains or correlations between the displacement of the joystick 12 and the actual actuation or movement of the respective left and right drive motor solenoids can be programmed into ECM 22 in the form of a plurality of speed correlated maps, look-up tables, equations or other programming. This steering mode is strictly dependent upon the ground speed of the work machine and progressively reduces the response of the machine to a steering command as the ground speed of the machine increases.

Figure 2:
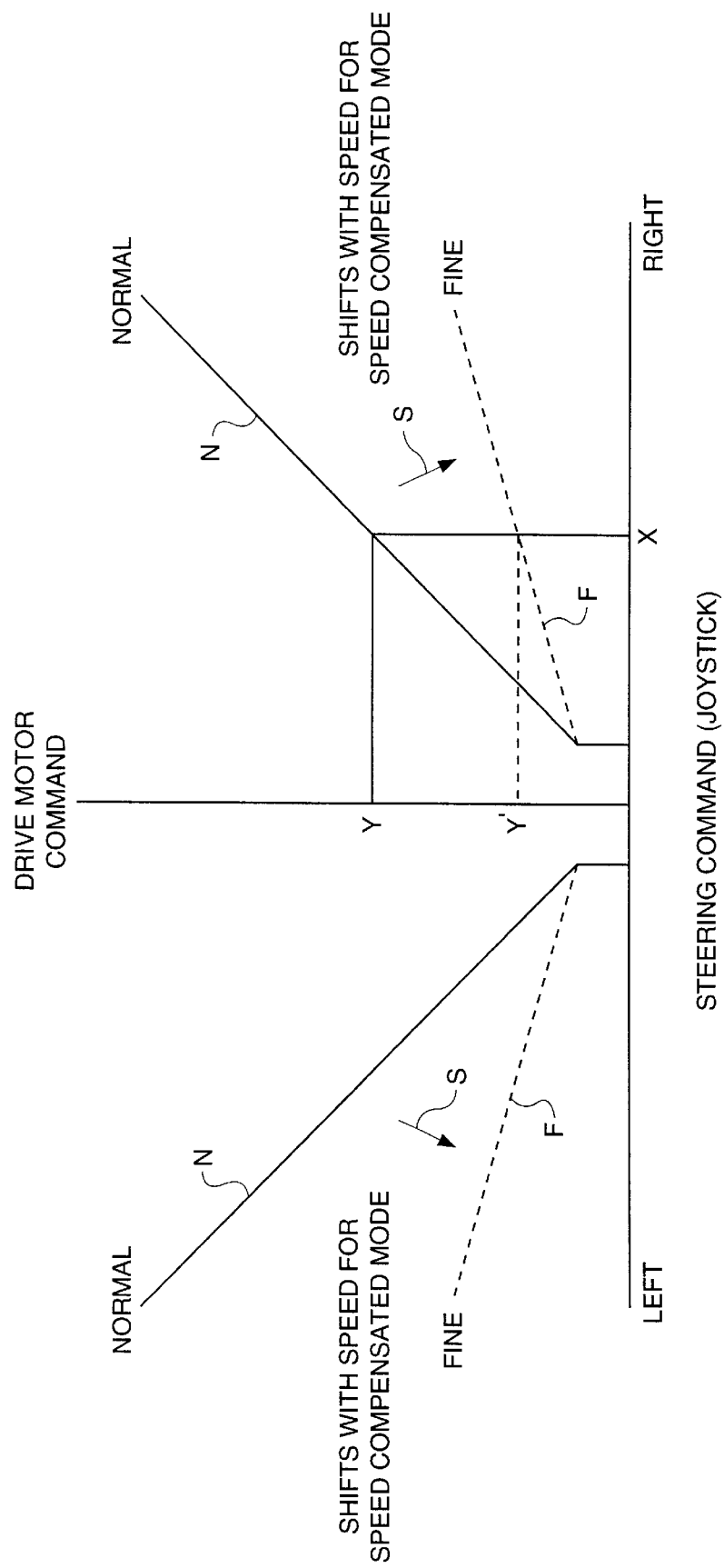
FIG. 2 is a graph illustrating the variable steering command gains associated with the present invention.

FIG. 2 is a graph representing the different steering command gains or correlations associated with the present invention. For example, the x-axis of FIG. 2 represents the steering command being inputted to the joystick 12 and the y-axis represents the respective left and right drive motor commands or outputs generated as a result of the steering command. In addition, lines N and F represent the steering gain or correlation established between the steering command and the drive motor command when the steering mode switch 36 is selected to either the Normal steering mode position or the Fine steering mode position. As is evident, the slope of lines N and F represent the steering gain or correlation desired. For example, if the steering command axis represents joystick displacement, a certain joystick displacement to the right as represented by point x in FIG. 2 will produce two different drive motor output commands y and y' depending upon which steering mode is selected, the y drive motor command being outputted when the steering mode switch 36 is in its Normal steering mode position and the y' drive motor command being outputted for the same joystick displacement x when switch 36 is in its Fine steering mode position. As can be seen from a review of FIG. 2, a different drive motor command results depending upon the particular steering mode selected. The drive motor command can be representative of the hydraulic pressure or hydraulic flow being outputted from the respective solenoids 14, 16, 18 and 20.

The drive motor command axis in FIG. 2 may also represent the current being outputted to the respective solenoids via conductive paths 28, 30, 32 and 34. In this correlation, the same amount of joystick displacement x will again produce two different current levels to the respective solenoids 14, 16, 18 and 20 thereby again increasing or decreasing the output from such solenoids based upon the particular steering mode selected. The speed of the respective right and left drive motors will be proportional to the output command received from the respective solenoids thereby controlling the speed and response of the work machine to the steering commands being inputted by the operator. The left side of FIG. 2 is a mirror image of the right side and the same correlation exists between displacement of the joystick to the left and the resulting drive motor command produced based upon the particular steering mode selected.

Again referring to FIG. 2, the arrows identified with the letter S represent the shift of the steering gain or correlation line N downwardly towards the line F based upon the particular ground speed of the machine. Any plurality of speed compensating steering gain lines may exist between lines N and F depending upon the programming inputted to ECM 22. These speed compensating steering gain lines will move downwardly towards line F as the work machine ground speed increases thereby resulting in a more reduced output from the respective solenoids to the left and right drive motors.

It is also recognized and anticipated that the steering mode switch 36 could be a proportional switch wherein a proportional input could be commanded by movement of the switch. For example, switch 36 could include a rotary selector dial wherein any plurality of desired steering gain possibilities could be selected between a maximum and minimum gain such as, for example, selecting any one of a plurality of steering gain relationships between the gain lines N and F illustrated in FIG. 2. This feature would allow the operator to set the desired gain of the steering system anywhere between a maximum and minimum gain without having to select a predetermined or preset steering gain such as the Normal or Fine steering mode positions associated with switch 36.

It is also recognized and anticipated that the steering gain may be varied based upon the particular type of tool being utilized on the work machine. For example, some work tools or attachments work at different operating pressures and therefore demand more or less from the hydraulic pump and hydraulic circuit servicing such tools or attachments. Depending upon the demand placed upon the overall hydraulic system servicing such tools and other machine functions, steering may be more difficult or jerky under certain operating conditions. Also, tools such as a cold planer pavement profiler require the work machine to inch forward very slowly while the tool chews up concrete or other pavement. In this situation, a less responsive steering mode may be desired such as the Fine steering mode discussed above with respect to the present invention. The particular steering mode parameters can be programmed into ECM 22 for specific work tools and such steering gain parameters can be selected by the operator when that particular work tool is attached to the work machine and utilized. Access to these particular steering modes can be accomplished through switch 36 by adding additional settings thereto, or through a computer system or other operator input device. A computer system may include a call-up menu or other operator selectable commands for selecting the desired steering mode. Still further, the particular tool or attachment may include a unique or specific identification code recognizable by the work machine when such tool is attached thereto, and such tool recognition can be inputted to ECM 22. ECM 22 will thereafter select the appropriate steering gain mode for that particular tool and output appropriate signals to the respective solenoids 14, 16, 18 and/or 20 to provide the desired steering control when such tool is being utilized.

The present steering control system 10 therefore enables an operator to select different modes of steering and vary the gain of the operator input steering device such as the joystick 12 based upon operating or environmental conditions, or based upon sensed conditions of the work machine such as the ground speed of the machine. Based upon the particular steering mode selected, ECM 22 will then output appropriate signals to the respective left and right drive motor solenoids for appropriate output to the respective drive motors.

Industrial Applicability

As described herein, the present steering control system 10 has particular utility in certain types of work machines such as track type loaders, track type tractors, skid steer loaders, excavators, and other types of work machines which utilize differential speed control to effect steering.

An example of operation in accordance with one aspect of the present invention is set forth in the flow chart 58 illustrated in FIG. 3. The operating steps in control loop 58 can be incorporated into the programming of the processing means of ECM 22 by techniques well known to those of ordinary skill in the art.

At step 60, ECM 22 will receive inputs from joystick 12 via conductive paths 24 and 26 relative to the displacement of the joystick 12 in any particular direction. ECM 22 will store the steering command inputted by joystick 12 and, at step 62, will likewise receive and store current speed information from sensors 50 and 52 via conductive paths 54 and 56 as previously explained. At step 64, ECM 22 will look at the signal inputted from switch 36 and determine which particular steering mode has been selected by the operator. This determination is accomplished at step 66.

If, at step 66, ECM 22 determines that the Normal steering mode has been selected by the operator via conductive path 44, ECM 22 will use the steering gain correlation represented, for example, by line N in FIG. 2 and will output appropriate signals to the respective solenoids 14, 16, 18 and/or 20 based upon this particular steering gain or correlation and based upon the particular displacement of joystick 12. The normal steering gain correlation typically corresponds to maximum output from the respective drive motor solenoids when the joystick 12 is positioned at its maximum displacement in any particular direction. This correlation is selected at step 68 and the appropriate signals to the appropriate solenoids are outputted from ECM 22 at step 70.

If, on the other hand, at step 66, ECM 22 determines that the Fine steering mode has been selected via switch 36, ECM 22 will now, at step 72, utilize the Fine steering mode gain or correlation, such as the correlation represented by line F in FIG. 2, and an appropriate signal will be outputted to the appropriate solenoids at step 70.

Still further, if, at step 66, ECM 22 determines that the Speed Compensating mode has been selected by the operator via switch 36, ECM 22 will now utilize the inputs received from sensors 50 and 52 regarding the actual ground speed of the work machine and, at step 74, ECM 22 will select the appropriate steering gain correlation, such as any one of a plurality of correlations represented by the arrow S in FIG. 2 between the Normal mode and the Fine mode, based upon the current ground speed of the work machine. Once this particular steering gain correlation is determined, appropriate output signals will be generated to the respective solenoids at step 70.

Electronic controllers or modules such as ECM 22 are commonly used in association with work machines for accomplishing various tasks. In this regard, ECM 22 will typically include processing means, such as a microcontroller or microprocessor, associated electronic circuitry such as input/output circuitry, analog circuit or programmed logic arrays, as well as associated memory. ECM 22 can therefore be programmed to sense and recognize the appropriate signals indicative of the various conditions, states of actuations of the joystick 12 and steering mode switch 36, or the signals inputted from sensors 50 and 52 indicative of the ground speed of the work machine, and, based upon such sensed conditions, ECM 22 will provide appropriate output signals to control the respective left and right drive motors in accordance with the particular steering mode gain or correlation selected.

It is also recognized that variations to the operating steps depicted in flow chart 58 could likewise be made without departing from the spirit and scope of the present invention. In particular, steps could be added or some steps could be eliminated. All such variations are intended to be covered by the present invention. For example, steering mode switch 36 could include additional selectable settings, or such steering mode inputs could come from a tool recognition system where specific steering modes are established for use with specific work tools or attachments mounted to the work machine. Still further, it is also recognized that in most applications, a steering control system including ECM 22 will include a variety of other components such as other switches, solenoids, relays, indicators, sensors and other control apparatus.

It is still further recognized that external devices, either mounted on the machine or used as service tools such as a laptop computer, can be utilized to input desired steering gain correlations. This data and corresponding parameters could be inputted to ECM 22 via these external devices for use by the operator via switch 36, or via other input devices such as a computer system having operator selectable commands whereby these newly inputted steering gain correlations can be accessed, selected and utilized.

As is evident from the foregoing description, certain aspects of the present invention are not limited to the particular details of the examples illustrated herein. It is therefore contemplated that other modifications and applications using other operator input devices and other steering gain scaling techniques will occur to those skilled in the art. It is accordingly intended that all such modifications, variations, and other uses and applications which do not depart from the spirit and scope of the present invention are deemed to be covered by the present invention.

Other aspects, objects and advantages of the present invention can be obtained from a study of the drawings, the disclosure and the appended claims.

We claim:

1. A control system for controlling the steering of a work machine wherein the work machine utilizes differential speed control for turning the machine and likewise includes left and right drive motors for enabling the work machine to move in a plurality of directions, said control system comprising:

an operator input device actuatable to command a particular direction of movement of the work machine including fore and aft movement and turning movement of the work machine;

operator selectable means for selecting any one of a plurality of different steering mode correlations between the actuation of the operator input device and operation of the respective left and right drive motors, each steering mode correlation representing a different mode of operation of the left and right drive motors for the same input to the operator input device; and an electronic controller coupled with said operator input device and with said operator selectable means for receiving signals therefrom, said controller being operable to receive a signal from said operator selectable means indicative of which steering mode correlation has been selected for use, and a signal from said operator input device indicative of a particular direction of movement of the work machine being commanded by the operator;

said controller outputting a signal to control the operation of the left and right drive motors in accordance with the selected steering mode correlation when said controller receives a signal from the operator selectable means indicative of which steering mode correlation has been selected for use, and a signal from said operator input device indicative of the particular direction of movement of the work machine being commanded by the operator.

2. The control system, as set forth in claim 1, wherein said operator input device is a two-axis joystick, one axis controlling fore and aft movement of the work machine and the other axis controlling left and right movement of the work machine.

3. The control system, as set forth in claim 1, wherein said operator selectable means includes a steering mode switch positionable to select any one of said plurality of steering mode correlations.

4. The control system, as set forth in claim 1, wherein said operator selectable means includes a computer system having operator selectable commands for selecting any one of said plurality of steering mode correlations.

5. The control system, as set forth in claim 1, wherein one of said plurality of steering mode correlations is a speed compensating mode based upon the ground speed of the work machine, said speed compensating mode including a plurality of different steering mode correlations, each steering mode correlation representing a different mode of operation of the left and right drive motors for the same input to the operator input device based upon the ground speed of the work machine, a different steering mode correlation existing for a predetermined incremental change in the work machine ground speed, said control system further including a speed sensor associated with each of said left and right drive motors for determining the ground speed of the work machine, said controller being coupled with said speed sensors for receiving signals therefrom indicative of the speed of the work machine, said controller outputting a signal to control the operation of the left and right drive motors in accordance with one of the plurality of steering mode correlations associated with said speed compensating mode when said controller receives a signal from said operator selectable means indicative of the speed compensating mode having been selected for use, a signal from said speed sensors indicative of the ground speed of the work machine, and a signal from said operator input device indicative of the particular direction of movement of the work machine being commanded by the operator.

6. The control system, as set forth in claim 5, wherein the plurality of steering mode correlations associated with the speed compensating steering mode are structured such that movement of the operator input device in any particular direction to achieve a specific mode of operation of the left and right drive motors increases as the ground speed of the work machine increases.

7. The control system, as set forth in claim 1, wherein each of the left and right drive motors includes at least one solenoid for controlling the operation thereof, said controller outputting a signal to the appropriate solenoids associated with the left and right drive motors based upon the particular steering mode correlation selected by the operator selectable means and based upon the particular direction of movement of the work machine being commanded by the operator by actuation of the operator input device.

8. The control system, as set forth in claim 1, wherein the work machine includes an implement system and at least one work tool mountable to the implement system, and wherein at least one of said steering mode correlations is structured based upon parameters associated with the operation of the at least one work tool when such work tool is mounted to the work machine.

9. A steering control system for controlling the steering of a work machine which utilizes differential speed control for turning the machine wherein the work machine includes left and right drive motors for effecting fore and aft movement and turning movement of the work machine, said steering control system comprising:

an operator input device positionable to command a particular direction of movement of the work machine;

a steering mode switch positionable to select any one of a plurality of different steering mode gains effective between actuation of the operator input device and operation of the respective left and right drive motors, each steering mode gain representing a different mode of operation of the left and right drive motors for the same positioning of the operator input device, said plurality of different steering mode gains including a speed compensating mode based upon the ground speed of the work machine, said speed compensating mode including a plurality of different steering mode gains effective between the actuation of the operator input device and operation of the respective left and right drive motors when so selected, each steering mode gain associated with said speed compensating mode representing a different mode of operation of said left and right drive motors for the same operator input based upon the ground speed of the work machine, a different steering mode gain existing for a predetermined incremental change in work machine around speed when said speed compensating mode is selected;

an electronic controller coupled with said operator input device and with said steering mode switch for receiving signals therefrom, said controller being operable to receive a signal from said steering mode switch indicative of which steering mode gain has been selected for use, and a signal from said operator input device indicative of a particular direction of movement of the work machine being commanded by the operator;

said controller outputting a signal to control the operation of the left and right drive motors in accordance with the selected steering mode gain when said controller receives a signal from said steering mode switch indicative of which steering mode gain has been selected for use, and a signal from said operator input device indicative of the particular direction of movement of the work machine being commanded by the operator.

10. The steering control system, as set forth in claim 9, wherein said operator input device is a joystick, said joystick being movable in the fore, aft, left and right directions so as to generate a signal indicative of a particular direction of movement of the work machine based upon the positioning of said joystick relative to a neutral position.

11. The steering control system, as set forth in claim 9, wherein each of said left and right drive motors includes a solenoid for controlling the forward movement of the work machine and a solenoid for controlling the reverse movement of the work machine, said controller outputting appropriate signals to the respective forward and reverse solenoids associated with the left and right drive motors based upon the selected steering mode gain to control the operation of said left and right drive motors to achieve the particular direction of movement of the work machine being commanded by the operator through the positioning of the operator input device.

12. The steering control system, as set forth in claim 9, wherein said plurality of different steering mode gains further includes first and second steering mode gains, said steering mode switch being positionable to select either of said first steering mode gain or said second steering mode gain, said first steering mode gain being representative of normal operation of the left and right drive motors wherein full scale movement of said operator input device to command at least fore and aft movement of the work machine outputs a signal to initiate a predetermined operation of said drive motors, and said second steering mode gain being representative of a reduced operation of the left and right drive motors wherein full scale movement of said operator input device to command at least fore and aft movement of the work machine outputs a signal to initiate operation of said left and right drive motors at a level of operation which is less than the predetermined operation of said drive motors initiated by said first steering mode gain.

13. The steering control system, as set forth in claim 9, wherein said steering control system further includes at least one speed sensor associated with the work machine for determining the ground speed thereof, said controller being coupled with said at least one speed sensor for receiving signals therefrom indicative of the ground speed of the work machine, said controller outputting a signal to control the operation of the left and right drive motors in accordance with the steering mode gain appropriate for the particular ground speed of the work machine when the controller receives a signal from said steering mode switch indicative of the speed compensating mode having been selected for use, a signal from said at least one speed sensor indicative of the ground speed of the work machine, and a signal from said operator input device indicative of the particular direction of movement of the work machine being commanded by the operator.

14. The steering control system, as set forth in claim 13, wherein the plurality of different steering mode gains associated with said speed compensating mode are structured such that a greater operator input to said operator input device is required to achieve a certain mode of operation of said left and right drive motors at faster work machine ground speeds as compared to slower work machine ground speeds.

* * * * *

UNITED STATES PATENT AND TRADEMARK OFFICE
CERTIFICATE OF CORRECTION

PATENT NO.     : 6,148,939
DATED          : November 21, 2000
INVENTOR(S)    : Roy V. Brookhart and Steven T. Ufheil It is certified that error appears in the above-identified patent and that said Letters Patent is hereby corrected as shown below:

correct Column 12, Claim 9, line 63 as follows:

Please delete [around]

and add:

-- ground --

Signed and Sealed this

First Day of May, 2001

NICHOLAS P. GODICI

Attest:

Attesting Officer

Acting Director of the United States Patent and Trademark Office